(No Model.)

M. ARBUCKLE.
WHEEL WASHING DEVICE.

No. 525,574. Patented Sept. 4, 1894.

Witnesses
Geo. C. Conner
Lela Monroe

Inventor
Matthew Arbuckle
By Attorney J. H. Lockwood

UNITED STATES PATENT OFFICE.

MATTHEW ARBUCKLE, OF INDIANAPOLIS, INDIANA.

WHEEL-WASHING DEVICE.

SPECIFICATION forming part of Letters Patent No. 525,574, dated September 4, 1894.

Application filed May 9, 1894. Serial No. 510,574. (No model.)

*To all whom it may concern:*

Be it known that I, MATTHEW ARBUCKLE, of Indianapolis, county of Marion, and State of Indiana, have invented a certain new and useful Vehicle-Wheel-Washing Machine; and I do hereby declare that the following is a full, clear, and exact description thereof, reference being had to the accompanying drawings, in which like figures refer to like parts.

Figure 1:
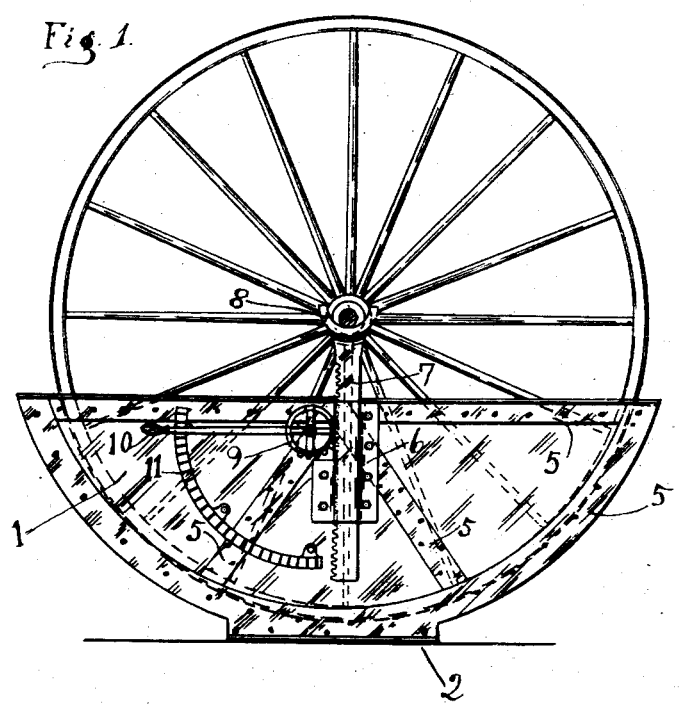
Figure 2:
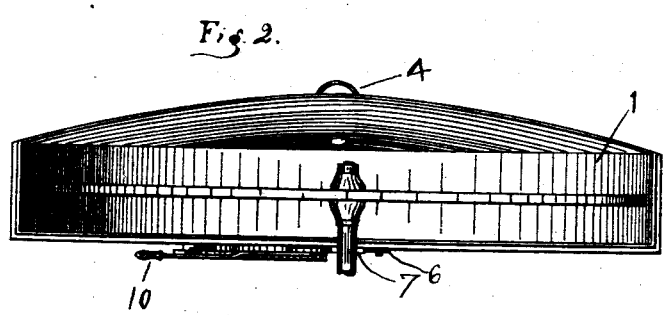
Figure 3:
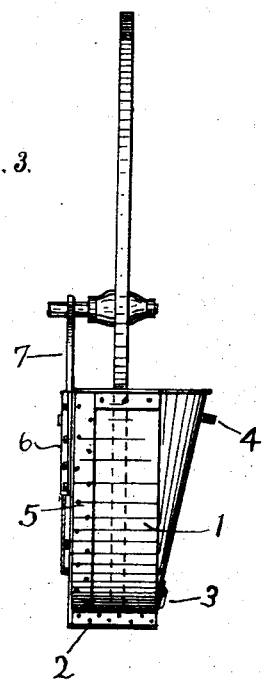

Figure 1 is a side elevation of my washing machine with a buggy wheel in it. Fig. 2 is a plan view of the same and Fig. 3 is an end view of the same, the buggy axle being broken away.

My method of cleaning vehicle wheels consists in mounting the wheel in a water tank 1 in such manner that the wheel can be rotated in the tank. I then place a few bucketfuls of water within the tank and by rotating the wheel through the water, it will be cleaned.

The form of the tank is in side elevation almost a half circle extending up reasonably close to the hub of the front wheel of a vehicle. On the lower side of the tank when the same is set upright, I provide a flat bottom 2 in order that when the wheel is mounted, the machine will be stationary. The width of the tank can be such as is in special instances most convenient but I find that about six inches width at the periphery is sufficient for ordinary buggy wheels. The portion of the tank to be on the inside of the buggy wheel is preferably vertical while the outside of the tank is preferably curved outward as shown in Figs. 2 and 3. The purpose of this swell is to give the tank greater width in the middle to allow a person to insert his arm in the tank for the purpose of using a brush or sponge in washing the wheel where the dirt is difficult to remove, and also in washing other parts of the vehicle. At the lower end of the tank on the outside, I provide a discharge aperture 3 covered by a screw cap or other water tight means for the purpose of discharging the water without turning over the tank if that be desired. At the top on the outside, I provide a handle 4. The preferable method however of discharging the water is by rotating the tank, wheel and all, thus allowing the water to run out at one end.

In order to mount the axle and wheel above the tank, I provide the following means: I strengthen the inner side of the tank by a metal plate 5 that extends about the periphery of the inner side of the tank, as seen in Fig. 1 and is riveted to the tank. It is provided with diagonal braces as is therein shown and covers the lower flat portion 2 of the tank. It also is turned about the edges as is seen in Fig. 3, in order to make the tank exceedingly strong and furnish a strong support for the elevating jack. To the upper central part of this plate 5 where it is secured to the tank, I rivet a plate 6 with its vertical central part curved outward to form a guide way for the vertical movement of the rack bar or jack 7 which has a semicircular top 8 for the reception of the axle. To operate this jack 7 vertically, I cut away the upper left hand corner of the plate 6 and mount a wheel 9 securely, which has spurs or teeth adapted to engage the rack bar or jack 7. The wheel 9 is operated by the lever 10, which are rigidly secured together. The lever 10 is made of spring metal and is curved outwardly as seen in Fig. 2 to make it convenient to handle, but the means of securing the wheel 9 to the plate or frame work 5 is such as to tend constantly to spring the lever 10 inward whereby at its outer end, it will engage the teeth of the segmental rack 11 and thus enable one by catching the lever 10 in the teeth in that segmental rack to hold the rack bar or jack 7 in any desired position. The wheel 9 is provided with teeth preferably on one half its periphery as seen in Fig. 1. By this means, when it is desired to let down the buggy wheel, the lever 10 is elevated until the teeth in the wheel 9 fail to engage the rack bar 7 whereupon the latter slips down.

The manner of placing my washing machine in the position shown in Fig. 1 is as follows: The washing machine being light, I place it behind or in front of the wheel in an almost vertical position as is illustrated by turning the drawing on its side. I then adjust the length of the rack bar 7 or jack to the wheel so that the latter will not rest on the bottom of the tank and then push the buggy back or pull it forward, as may be desired, so that the wheel and washing machine together will rotate until the washing machine comes on the bottom as seen in Fig. 1. After the wheel is cleaned or when it is desired to empty the tank, I reverse the process just described, turning the wheel and washing machine both back so that the washing machine will be in almost a vertical position again. I then remove the washing machine or if not done with it in connection with that wheel, allow the water to run out and then turn back the wheel and the machine and put in a fresh supply of water. This process is very easily and quickly done. The tank need not be wide so that but very little water, two or three bucketfuls, will be ample. The tank is preferably made of zinc but because of the bracing construction 5 it will readily support a vehicle of ordinary weight without injury. I find that by placing a large sponge in the bottom of my tank while the wheel is being rotated through the water, the sponge will so envelop the tire and felly on all sides as to thoroughly rub and quickly cleanse the same.

What I claim as my invention, and desire to secure by Letters Patent, is—

1. A vehicle wheel washing machine consisting of a semicircular tank, an iron frame work on one side thereof, and a jack mounted on such frame work adapted to support the wheel so that it will rotate within the tank.

2. A vehicle wheel washing machine consisting of a semicircular tank, a vertical guide way provided on one side thereof, a vertical rack bar adapted to operate within such guide way and having a head adapted to receive the axle of the vehicle, and means of elevating, lowering and holding such rack bar.

3. A vehicle wheel washing machine consisting of a semicircular tank, a frame work secured to such tank and provided with a vertical guide way, a rack bar vertically movable in such guide way and having a head adapted to receive the axle of the vehicle, a wheel mounted on the frame work and provided with teeth on a portion of its periphery adapted to engage the rack bar, a lever secured to such wheel and adapted to operate the same, and means of holding such lever in any desired position.

In witness whereof I have hereunto set my hand this 5th day of May, 1894.

MATTHEW ARBUCKLE.

Witnesses:
V. H. LOCKWOOD,
G. C. CONNER.